(12) United States Patent
Bauer

(10) Patent No.: US 10,472,184 B2
(45) Date of Patent: Nov. 12, 2019

(54) TRANSPORT DEVICE FOR TRANSPORTING CONTAINERS

(71) Applicant: KRONES AG, Neutraubling (DE)

(72) Inventor: Veronika Bauer, Regensburg (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/034,759

(22) Filed: Jul. 13, 2018

(65) Prior Publication Data

US 2019/0071259 A1    Mar. 7, 2019

(30) Foreign Application Priority Data

Sep. 4, 2017  (DE) .................. 10 2017 215 454

(51) Int. Cl.
| | |
|---|---|
| *B65G 39/00* | (2006.01) |
| *B65G 43/00* | (2006.01) |
| *B65G 15/22* | (2006.01) |
| *B65G 47/86* | (2006.01) |

(Continued)

(52) U.S. Cl.
CPC .............. *B65G 47/847* (2013.01); *B65C 9/02* (2013.01); *B67C 7/0053* (2013.01); *B65G 2201/0261* (2013.01)

(58) Field of Classification Search
None
See application file for complete search history.

(56) References Cited

U.S. PATENT DOCUMENTS

| | | | | |
|---|---|---|---|---|
| 5,509,524 A | * | 4/1996 | Ohmori | B65B 43/60 198/465.1 |
| 5,613,593 A | * | 3/1997 | Gerber | B65G 47/847 198/377.03 |

(Continued)

FOREIGN PATENT DOCUMENTS

| | | | | |
|---|---|---|---|---|
| DE | 19512515 A1 | * | 5/1996 | ........... B65G 47/847 |
| DE | 10122752 A1 | | 11/2002 | |

(Continued)

OTHER PUBLICATIONS

European Search Report for Application No. 18169404.3, dated Nov. 27, 2018.

(Continued)

*Primary Examiner* — Kavel Singh
(74) *Attorney, Agent, or Firm* — Marshall, Gerstein & Borun LLP

(57) ABSTRACT

A transport device for transporting containers with a plurality of pucks, each designed for receiving a container and for standing transport of the container, the transport device having an intermediate starwheel and a container lifting device to adjust the vertical position of the containers, and the transport device permitting the containers to be transported by the pucks to an inlet of a treatment machine and away from an outlet of the treatment machine. The container lifting device of the transport device is integrally formed with or attached to the intermediate starwheel and is formed and arranged in operation such that it lifts the containers, for removing the containers from the pucks, before they pass through a treatment section of the treatment machine and lowers the containers, for inserting the containers into the pucks, after they have passed through the treatment section.

11 Claims, 3 Drawing Sheets

(51) Int. Cl.
*B65C 9/02* (2006.01)
*B67C 7/00* (2006.01)

(56) References Cited

U.S. PATENT DOCUMENTS

| | | | | |
|---|---|---|---|---|
| 5,613,595 A | * | 3/1997 | Ukada | B65G 25/02 198/774.3 |
| 2013/0180834 A1 | | 7/2013 | Scheibenpflug et al. | |
| 2018/0178989 A1 | | 6/2018 | Drexler et al. | |

FOREIGN PATENT DOCUMENTS

| | | |
|---|---|---|
| DE | 202009012064 U1 | 2/2011 |
| DE | 102011084721 A1 | 4/2013 |
| DE | 102012100318 A1 | 7/2013 |
| EP | 1028075 A1 | 8/2000 |
| EP | 1264771 A1 | 12/2002 |
| EP | 2615047 A1 | 7/2013 |
| EP | 3339222 A1 | 6/2018 |
| WO | WO-2015/055390 A1 | 4/2015 |
| WO | WO-2016/020293 A1 | 2/2016 |
| WO | WO-2017/140397 A1 | 8/2017 |

OTHER PUBLICATIONS

International Search Report for Application No. PCT/EP2018/072510, dated Nov. 30, 2018.
German Search Report for Application No. 10 2017 215 454.3, dated Feb. 20, 2018.

* cited by examiner

TRANSPORT DEVICE FOR TRANSPORTING CONTAINERS

CROSS-REFERENCE TO RELATED APPLICATION

The present application claim priority to Germany Patent Application No. 102017215454.3, filed Sep. 4, 2017. The priority application, DE 102017215454.3, is hereby incorporated by reference in its entirety.

FIELD OF THE DISCLOSURE

The invention refers to a transport device for transporting containers with a plurality of pucks, which are each designed for receiving a container and for standing transport of the container, the transport device comprising an intermediate starwheel and a container lifting device, which is designed for adjusting the vertical position of the containers, and the transport device being designed such that the containers can be transported by means of the pucks to an inlet of a treatment machine and away from an outlet of the treatment machine.

BACKGROUND

In principle, when processing containers, suitable transport of the containers between and in the corresponding treatment machines, for example labelers, direct printing machines or inspection machines, is of great importance. It must be ensured that the containers do not fall over and, in many cases, that they are transported into the treatment machine at specified spacings and with suitable alignment.

Containers that have a complex shape, in particular those that do not have their own standing area or have a standing area that does not provide sufficient stability, pose a particular challenge.

It is known to use so-called pucks to transport containers individually. The pucks are interchangeable transport elements, each with a bottom and lateral support elements that laterally support containers standing on the bottom. In particular, these can be cup-shaped elements with a receptacle in which a lower part of the containers is received. A puck with a receptacle form corresponding to the type of container currently to be processed can be selected. The containers can be transported upright and are stabilized by the corresponding receptacles or lateral support elements.

Until now, with this type of transport, the pucks have been transported to a treatment machine, where the containers are transferred to the treatment machine by lifting them out of the pucks. In the treatment machine, the containers run for example on a carousel. After the containers have passed through the treatment machine, they are each put back into a puck.

The transport devices often comprise an infeed starwheel and an outfeed starwheel and both the infeed starwheel and the outfeed starwheel are each assigned their own intermediate starwheel, whereby an intermediate starwheel is arranged in the transport direction in front of the infeed starwheel and another intermediate starwheel is arranged in the transport direction after the outfeed starwheel. The intermediate starwheels can each be designed as lifting starwheels, which lift the containers out of the pucks or place them into the pucks by lifting or lowering the containers.

There are now two variants to implement this configuration.

On the one hand, two puck transport circuits can be provided. In order to ensure faultless removal and reinsertion of the containers, an infeed worm is typically arranged in the respective puck transport circuit in front of the corresponding lifting starwheel, which infeed worm brings the pucks to pitch, i.e., creates a suitable spacing. Thus there is an inlet circuit and an outlet circuit. The advantage of the design is that both worms can be coupled simultaneously and therefore no supply flow or return flow of pucks is necessary. In addition, both circuits can be controlled independently of each other.

However, this requires a large number of transport belts and relatively much space. In addition to the high space requirement, there is also the problem that precise control of the pucks or puck flow is required to put the containers back into a puck after passing through the treatment machine. The controller must ensure that each puck is in exactly the right position to receive a container in the outlet of the treatment machine. Such devices and the corresponding control procedure are relatively complicated. This means that the two circuits must be synchronized very precisely. This makes the replacing and cleaning of the pucks very time-consuming.

On the other hand, a transport circuit can be provided for the pucks. However, the infeed worm can typically only be coupled up to a certain speed, so that when the system is started up, either empty pucks have to be initially introduced or pre-fed (which entails a great logistical effort) or the first containers have to be transported through the system at reduced speed. Since in the second case the containers have not yet reached their nominal speed in the treatment machine, they cannot be treated there, so that the first containers of each batch form rejects.

The object underlying the invention is therefore to provide a cost-effective device in terms of acquisition and operation, which enables simple and space-saving assembly as well as simplified maintenance and change of set, while ensuring low waste.

The object is achieved by the subject matter of the independent claims.

The transport device is designed in such a way that the container lifting device is designed integrally with or attached to the intermediate starwheel and is designed and arranged in operation in such a way that it lifts the containers for removing the containers from the pucks before they pass through a treatment section of the treatment machine and lowers the containers for inserting the containers into the pucks after they have passed through the treatment section. The container lifting device can be designed in particular for simultaneous lifting of containers in the inlet and lowering of containers in the outlet of the treatment machine.

The fact that the containers are no longer lifted and lowered using separate lifting mechanisms, such as two separate lifting starwheels, but by means of the intermediate starwheel, which performs both functions, results in lower investment costs, lower operating costs, shorter changeover times during change of set and a lower space requirement. This is particularly noticeable when lifting starwheels are used. Lifting starwheels have relatively high production costs. This means that investment costs can be particularly greatly reduced if exactly one lifting starwheel is provided for lifting, lowering, transferring and removing containers. The advantage of the claimed transport device is also that only one puck circuit is required to transport the pucks due to the no longer existing spatial separation, which is entailed by two intermediate starwheels. In addition, only one infeed worm is required. Compared to two separate puck circuits and two infeed worms, this saves space and reduces acquisition costs, operating costs and maintenance costs. Furthermore, the changeover times during change of set are shortened. In addition, the problem of exact synchronization is eliminated. Furthermore, since only one infeed worm is required on the inlet side, the machine speed can be increased to nominal speed after the infeed worm has been coupled, so that no additional rejects are produced at the start of a batch even without empty pucks being initially introduced or pre-fed. If two infeed worms are used, however, a puck flow to the second worm would first have to be ensured, so that, without initial introduction or pre-feed of empty pucks, containers are transported through the machine without being able to be printed, as a fixed treatment speed is required.

The pucks can be conveyed, for example, by means of a transport belt or a conveyor chain which pulls the pucks along a transport route. In principle, other transport mechanisms, such as magnetic transport, are also possible.

The transport device may comprise an infeed starwheel and an outfeed starwheel and the intermediate starwheel may be arranged between the infeed starwheel and the outfeed starwheel in such a way that, when the containers are transferred to the infeed starwheel and taken over from the outfeed starwheel, it simultaneously forms the counterpart to the infeed starwheel and the outfeed starwheel. The intermediate starwheel can be designed in particular for simultaneous transfer of containers to an infeed starwheel and removal of containers from an outfeed starwheel.

Up to now it has been known to assign a separate intermediate starwheel to each of the infeed starwheel and the outfeed starwheel, with which containers are transferred to the infeed starwheel or removed from the outfeed starwheel. An intermediate starwheel described above, which is assigned to the inlet and the outlet at the same time, has the advantage that one intermediate starwheel can be saved. This is more space-saving and reduces costs, especially if the intermediate starwheels are lifting starwheels.

The container lifting device can be designed to transfer the containers to the infeed starwheel and to take over the containers from the outfeed starwheel. This makes it unnecessary to provide further transport routes or transport or transfer devices with which the container is transferred to the infeed starwheel or taken over from the outlet starwheel after lifting or before lowering.

The container lifting device can be designed in such a way that the containers are lifted in such a way that after lifting they are in a position in which they can be transferred to holding elements of the infeed starwheel. Thus containers can be brought from the height at which they are transported in the pucks to the height at which they are then further transported in the infeed starwheel and transferred to the treatment section. The height at which the containers are transferred to the infeed starwheel typically corresponds also to the height at which the containers are transported along the treatment section.

The container lifting device can be designed to take over the containers from holding elements of the outfeed starwheel and then lower the containers. This makes it possible that no further mechanism is necessary, which takes over containers from the holding elements of the outfeed starwheel and then transfers them to the container lifting device.

The container lifting device may comprise lifting elements for gripping one container at a time and a curve guide which is designed and arranged in operation such that the lifting elements or part of each lifting element are lifted so far after the containers have been gripped that the containers are removed from the pucks and/or lowered so far before the containers are released that the containers are placed in the puck. The fact that the containers are gripped makes it particularly easy to remove them from the pucks and transfer them to the infeed starwheel or to take them over in a particularly easy way from the outfeed starwheel and insert them into the puck. The advantage of the curve guide is that it is not necessary to control the lifting device with a control device. Instead, the suitable movement of the gripping elements can be effected purely mechanically. Of course, it is also possible to provide a controller that controls the gripping elements.

The lifting elements can be designed in particular in the form of gripping elements or comprise such elements, whereby a gripping element grips a container during operation, holds it when the container is lifted and then transfers it to the infeed starwheel. The gripping element is also designed to take over the container from the outfeed starwheel by gripping the container, holding the container when it is lowered and then placing it back into the puck. A control device may be provided to control these gripping, holding and dispensing operations. Alternatively, they can also be triggered mechanically. In particular, these processes and the height adjustment of the gripping elements can be effected purely mechanically.

The transport device can be designed in such a way that the containers are transported hanging, from the removal of the containers from the pucks to the insertion of the containers into the pucks, especially when passing through the treatment section.

The intermediate starwheel can be designed as a lifting starwheel. This means that the intermediate starwheel is in the form of a starwheel that already provides a lift mechanism. This allows the provision of a compact and entirely pre-installed solution.

The transport device can be designed in such a way that the pucks are transported along a puck circuit to and away from the intermediate starwheel. If there is only one circuit, fewer transport belts and infeed worms are required and no complex synchronization is required, as has already been explained above. This means that the circuit in the area of the machine, especially in the inlet and outlet, is uninterrupted.

The transport device can comprise an infeed worm which is designed and arranged in such a way that, before the containers are removed from the pucks, it creates a predetermined spacing between successive pucks. In particular, exactly one such infeed worm can be provided, especially if there is exactly one puck circuit. This enables a smaller and more compact design of the device and lower acquisition, maintenance and operating costs compared to the known systems with several circuits.

The transport device can include an adapter plate which can be used to set a starwheel position. The starwheel position depends on the pitch distance or spacing of the treatment machine and the pitch circle of the central starwheel, whereby the pitch circle diameter of the central starwheel depends on the required lift and the length of the pucks, and on the number of pitches.

The method for transporting pucks and containers comprises transporting each container standing in a puck to an inlet of a treatment machine, transporting it along a treatment section of the treatment machine and transporting it standing in a puck away from an outlet of the treatment machine.

The containers are lifted by means of a container lifting device, which is designed integrally with or attached to an intermediate starwheel, for removing the containers from the pucks before they pass through the treatment section, and are lowered for inserting the containers into the pucks after they have passed through the treatment section.

The containers can be transferred from the intermediate starwheel to an infeed starwheel of the treatment machine, can then be transported along the treatment section and, after having passed through the treatment section, transferred from an outfeed starwheel to the intermediate starwheel.

The containers can be transported hanging, from the removal of the containers from the pucks to the insertion of the containers into the pucks, especially when passing through the treatment section.

It goes without saying that the features and advantages mentioned in connection with the device are also applicable to the method.

BRIEF DESCRIPTION OF THE DRAWINGS

Further features and advantages are explained below using the exemplary figures, of which:

Unless otherwise described, the same reference numerals are used for identical or comparable elements in the figures.

FIG. 1 shows an embodiment of a transport device 1 for transporting containers 2 with a plurality of pucks 3 for receiving and standing transport of a container.

Figure 1A:
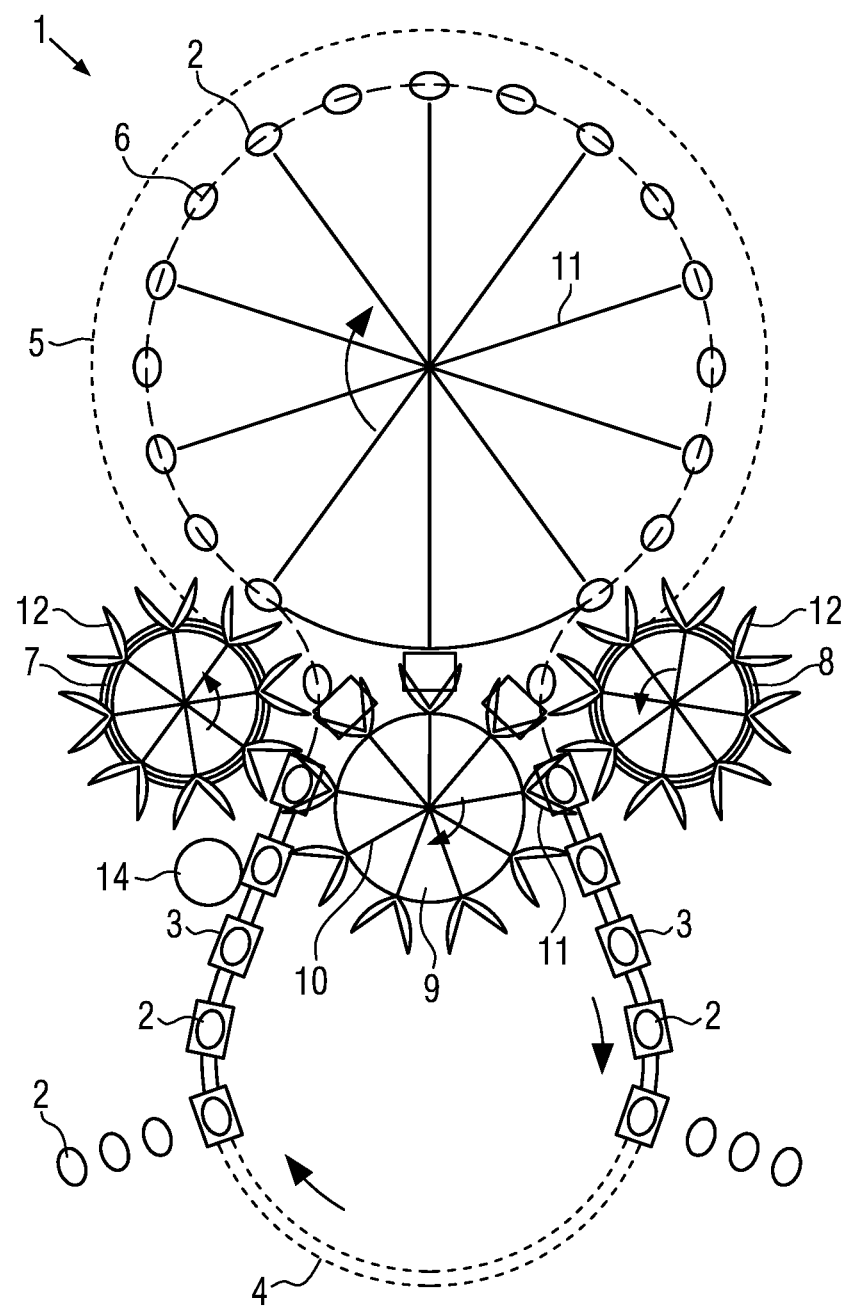
FIG. 1a show a schematic, not true-to-scale plan view of an embodiment of the transport device.
Figure 1B:
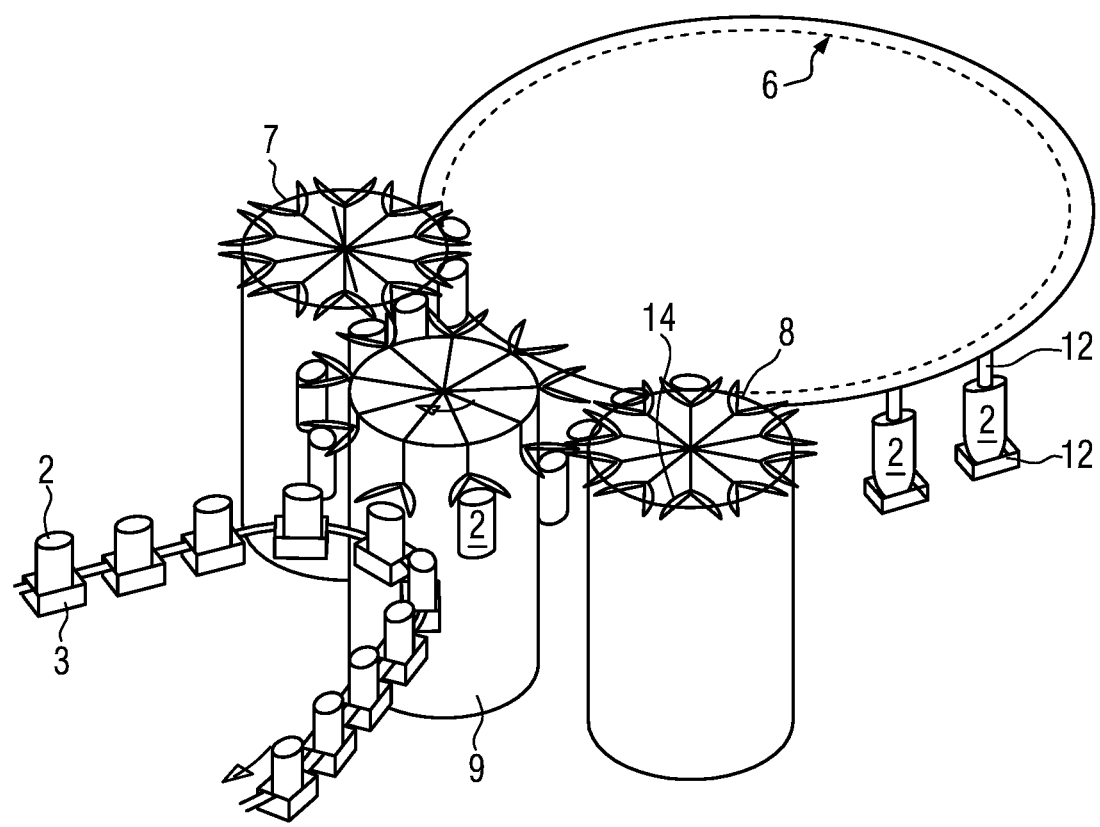
FIG. 1b shows a schematic, oblique view of an embodiment of the transport device.

As can be seen in the oblique view in FIG. 1b, the pucks are designed in such a way that the lower part of the containers is standing in a receptacle and is supported laterally by the walls of the receptacle. For example, the pucks are transported by one or more transport belts arranged below the pucks (not shown here) for conveying the pucks. An optionally provided spacing starwheel 14 brings the pucks to a suitable spacing in front of the machine inlet, i.e. the pucks are positioned so that they can be transferred to the intermediate starwheel rotating during operation. In the pucks, containers in the form of bottles are here shown as an example, wherein the pucks can also be designed for transporting other containers.

The transport device is designed in such a way that the containers can be transported to and away from the treatment section by means of the pucks. Here the transport device transports the pucks along a transport route marked with the reference numeral 4 to an inlet of the treatment machine, where in operation the containers are removed from the puck, and away from an outlet of the treatment machine, where in operation the containers are placed back into the pucks.

In this example, the transport route of the pucks forms exactly one circuit, which is indicated here by a dashed line. It should be noted that the containers can be fed and removed at any point along the transport route. The pucks can be transported, for example, by means of a conveyor belt arranged below or by means of magnetic transport or in other ways.

FIG. 1a also shows a treatment machine 5, which is not part of the transport device, and a treatment section 6, which is marked here as a dashed line with the reference numeral 6. The treatment section extends from the inlet of the treatment machine to the outlet of the treatment machine, especially in the example shown here from an infeed starwheel 7 to an outfeed starwheel 8. The treatment machine can be a rotary machine. The treatment machine can be, for example, a direct printing machine, a labeler or an inspection machine. In the treatment machine, containers are transported and treated along the treatment section, for example printed, labeled or inspected. The transport device is here designed in such a way that the containers are removed from the pucks as they pass through the treatment section and are held, for example, by holding elements of the treatment machine.

The transport device also includes an intermediate starwheel 9, which forms the counterpart to the infeed starwheel and the outfeed starwheel.

In the example described above and shown in FIGS. 1a and 1b, the containers are lifted in the inlet and lowered in the outlet to be removed from or inserted into the pucks. In particular, the containers are lifted before transfer to the infeed starwheel and lowered after taking over from the outfeed starwheel.

Figure 2:
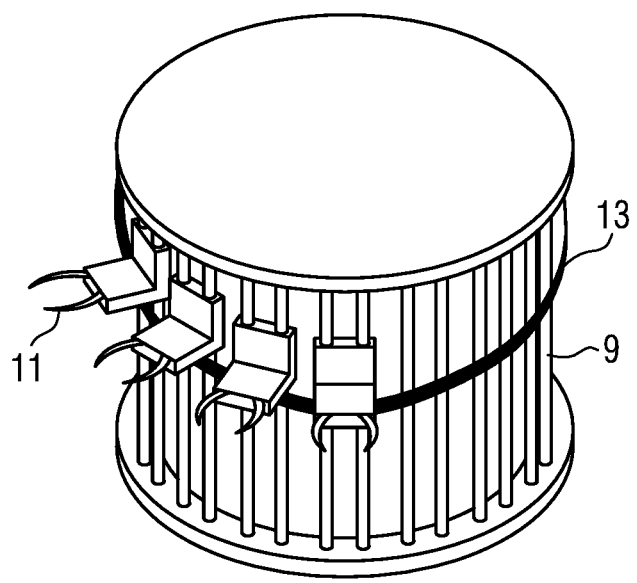
FIG. 2 shows a schematic, not true-to-scale oblique view of a first lifting device.

For this purpose, the transport device comprises a container lifting device 10, which is designed to adjust the vertical position of the containers. The container lifting device is designed in such a way that it lifts the containers for the transfer of the containers to the infeed starwheel and lowers them after the containers have been taken over from the outfeed starwheel. The container lifting device can be designed integrally with the intermediate starwheel, i.e. the intermediate starwheel can be designed in the form of a lifting starwheel. Alternatively, the container lifting device can also be attached to the intermediate starwheel. A possible design of the container lifting device is shown in FIG. 2.

In this example, the container lifting device is designed integrally with the intermediate starwheel, i.e. the intermediate starwheel is designed in the form of a lifting starwheel. Alternatively, it can also be attached to it.

The figures show lifting elements in the form of gripping elements 11 of the intermediate starwheel, which are designed to grip the containers 2. With the gripping elements, the containers standing in the pucks are gripped, lifted and held until they are transferred to the infeed starwheel, and then, after having been taken over from the outfeed starwheel, gripped and held again while they are lowered until they are again standing in the pucks.

For lifting and lowering the gripping elements, for example, a curve guide (not shown here for reasons of view and overview) may be provided. Alternatively, the gripping elements can also be mounted on an inclined rotary axis. Other possibilities are also possible as long as the gripping elements, and thus the containers, are lifted on the inlet side and lowered on the outlet side so that the containers can be transferred to the infeed starwheel or taken over from the outfeed starwheel.

The figure also shows gripping elements of the infeed starwheel and the outfeed starwheel 12.

FIG. 2 shows a possible design of a container lifting device which can be used for the transport device described above or another transport device according to the invention, whereby here a curve guide 13 is shown as an example, by means of which gripping elements are lifted.

In the example shown, the gripping elements are moved up and down guided by the curve guide. For example, the gripping elements may be designed so that they extend radially outwards from the rotary axis of the intermediate starwheel, and a movement of the gripping elements relative to the intermediate starwheel is blocked except for the lifting of their outer end, i.e. a vertical movement at the gripping end, which leads to an up/down pivoting. Alternatively, the entire gripping element can also be moved vertically, for example along a guide.

The curve guide can be arranged and designed so that the gripping end of the gripping elements or the gripping elements are lifted from a first level to a second level so that they are in the transfer area of the containers to the infeed starwheel on the second level and are guided in such a way that they are also in the takeover area of the containers from the outfeed starwheel on the second level and are then lowered again to the first level. This means that the pucks run at the same height to the inlet, from there to the outlet and away from the outlet.

The following describes an exemplary method according to the invention for transporting containers. The method can be carried out, for example, using one of the devices described above.

In the exemplary method, containers are transported each standing in a puck to an inlet of a treatment machine, transported along the treatment section and transported away each standing in a puck from an outlet of the treatment section. The containers are removed from the pucks as they pass through the treatment section.

The containers are lifted in the inlet and thus removed from the pucks, i.e., with a container lifting device which is designed integrally with or attached to an intermediate starwheel (for example as described above in connection with the device). The containers are then transported into the treatment machine. For this purpose, they can be transferred from the intermediate starwheel or the lifting device to an infeed starwheel and then to the treatment section. After having passed through the treatment section, the containers are lowered again, also by means of the container lifting device, and thus inserted into the pucks. In particular, the containers can be transferred from the treatment section to an outfeed starwheel and from there to the container lifting device.

The containers can be transported hanging at least after removal from the pucks and before transfer to the treatment machine and after taking over from the treatment machine and before transfer to the pucks. In addition, the containers can optionally also be transported hanging in the treatment machine.

Suitable lifting and lowering can be carried out, for example, by means of a container lifting device described in connection with the device.

It goes without saying that features mentioned in the embodiments described above are not limited to these special combinations and are also possible in any other combinations.

The invention claimed is:

1. A transport device for transporting containers with a plurality of pucks, which are each designed for receiving a container and for standing transport of the container,
the transport device comprising an intermediate starwheel and a container lifting device designed to adjust the vertical position of the containers, and
the transport device being designed such that the containers can be transported by means of the pucks to an inlet of a treatment machine and away from an outlet of the treatment machine,
the container lifting device being integrally formed with or attached to the intermediate starwheel and formed and arranged in operation such that it lifts the containers for removing the containers from the pucks before they pass through a treatment section of the treatment machine and lowers the containers for inserting the containers into the pucks after they have passed through the treatment section,
wherein the transport device comprises an infeed starwheel and an outfeed starwheel and the container lifting device is designed for transferring the containers to the infeed starwheel and for taking the containers over from the outfeed starwheel.

2. The transport device according to claim 1, wherein the intermediate starwheel is arranged between the infeed starwheel and the outfeed starwheel such that during transfer to the infeed starwheel and taking over from the outfeed starwheel, it simultaneously forms the counterpart to the infeed starwheel and the outfeed starwheel.

3. The transport device according to claim 1, wherein the container lifting device is designed such that the containers are lifted in such a way that after lifting they are in a position in which they can be transferred to holding elements of the infeed starwheel.

4. The transport device according to claim 1, wherein the container lifting device is designed for taking over the containers from holding elements of the outfeed starwheel and for subsequently lowering the containers.

5. The transport device according to claim 1, wherein the container lifting device comprises lifting elements for gripping a respective container and a curve guide, which is designed and arranged in operation such that the lifting elements are lifted so far after gripping of the containers that the containers are removed from the pucks and/or are lowered so far before the containers are released that the containers are placed in the puck.

6. The transport device according to claim 1, wherein the transport device is designed such that the containers are transported hanging, from the removal of the containers from the pucks until insertion of the containers into the pucks.

7. The transport device according to claim 1, wherein the intermediate starwheel is designed as a lifting starwheel.

8. The transport device according to claim 1, wherein the transport device is designed such that the pucks are transported along a puck circuit to and away from the intermediate starwheel.

9. The transport device according to claim 1, comprising an infeed worm which is designed and arranged in such a way that, before removing the containers from the pucks, it creates a predetermined spacing between successive pucks.

10. A method for transporting pucks and containers comprising the steps of:
transporting a plurality of containers, each standing in a puck, to an inlet of a treatment machine,
the transporting of the containers being along a treatment section of the treatment machine,
transporting containers, each standing in a puck, away from an outlet of the treatment machine,
lifting the containers by means of a container lifting device, which is integrally formed with or attached to an intermediate starwheel, for removing the containers from the pucks before they pass through the treatment section, and
lowering the containers for inserting the containers into the pucks after they have passed through the treatment section;
transferring the containers from the intermediate starwheel to an infeed starwheel of the treatment machine, subsequently transporting the containers along the treatment section, and transferring the containers from an outfeed starwheel to the intermediate starwheel after having passed through the treatment section.

11. The method for transporting pucks and containers according to claim 10, further comprising transporting the containers in a hanging manner, from the removal of the containers from the pucks until insertion of the containers into the pucks, in particular when passing through the treatment section.

\* \* \* \* \*